United States Patent
Xiang

(10) Patent No.: US 9,972,118 B2
(45) Date of Patent: May 15, 2018

(54) ANIMATION PLAYBACK METHOD AND APPARATUS

(71) Applicant: TENCENT TECHNOLOGY (SHENZHEN) COMPANY LIMITED, Shenzhen, Guangdong (CN)

(72) Inventor: Longlin Xiang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days. days.

(21) Appl. No.: 15/173,093

(22) Filed: Jun. 3, 2016

(65) Prior Publication Data

US 2016/0300380 A1    Oct. 13, 2016

Related U.S. Application Data

(63) Continuation of application No. PCT/CN2015/073033, filed on Feb. 13, 2015.

(30) Foreign Application Priority Data

Feb. 25, 2014 (CN) .......................... 2014 1 0065537

(51) Int. Cl.
  *G06T 13/80* (2011.01)
  *G06F 9/44* (2018.01)
  (Continued)

(52) U.S. Cl.
  CPC ............ *G06T 13/80* (2013.01); *G06F 9/4443* (2013.01); *G06F 17/212* (2013.01); *G06T 11/20* (2013.01); *H04L 47/19* (2013.01)

(58) Field of Classification Search
  USPC .......................................... 345/473; 715/202
  See application file for complete search history.

(56) References Cited

U.S. PATENT DOCUMENTS 8,302,016 B2 * 10/2012 Goto ................. G06F 17/30899
  715/742
8,752,206 B2 * 6/2014 Joseph ............... H04N 21/2541
  713/150

(Continued)

FOREIGN PATENT DOCUMENTS

CN    101320482 A    12/2008
CN    101980154 A    2/2011
(Continued)

OTHER PUBLICATIONS

International Search Report in international application No. PCT/CN2015/073033, dated May 13, 2015.
(Continued)

*Primary Examiner* — Kimbinh T Nguyen
(74) *Attorney, Agent, or Firm* — Baker & Hostetler LLP

(57) ABSTRACT

The present disclosure discloses an animation playback method and apparatus, and relates to the field of computer technologies. The method includes: acquiring a first location and a first offset angle of an object in a first period, the first period being before a current period; acquiring a second location of the object in the current period according to the first location and the first offset angle; and drawing an image of the object in a preset region in a web page according to the second location if the second location is in the preset region in the web page. The apparatus includes: a first acquisition module, a second acquisition module, and a first drawing module. The present disclosure can reduce traffic required by a terminal for acquiring web page data, and shorten a time used by the terminal to acquire the web page data.

15 Claims, 4 Drawing Sheets

(51) Int. Cl.
  *G06F 17/21* (2006.01)
  *G06T 11/20* (2006.01)
  *H04L 12/801* (2013.01)

(56) References Cited

U.S. PATENT DOCUMENTS

| | | | |
|---|---|---|---|
| 9,191,462 B2* | 11/2015 | Goto | G06F 17/30899 |
| 9,317,598 B2* | 4/2016 | Mate | G06F 17/30843 |
| 9,451,319 B2* | 9/2016 | Maitre | H04N 21/643 |
| 9,485,459 B2* | 11/2016 | Shoemake | G06F 3/011 |
| 9,626,076 B2* | 4/2017 | Lee | G06F 3/0482 |
| 2005/0181871 A1 | 8/2005 | Higashiyama | |
| 2009/0094518 A1 | 4/2009 | Lawther | |
| 2009/0111579 A1 | 4/2009 | Komatsumoto | |
| 2011/0129196 A1* | 6/2011 | Hayashi | H04L 12/2812 386/234 |
| 2011/0283334 A1* | 11/2011 | Choi | G06F 3/04883 725/148 |
| 2013/0124952 A1* | 5/2013 | Frem | G06F 17/212 715/202 |
| 2013/0307856 A1* | 11/2013 | Keane | G10L 21/10 345/473 |
| 2014/0229820 A1* | 8/2014 | Li | G06F 17/30905 715/234 |
| 2015/0192990 A1* | 7/2015 | Qiang | G06F 3/012 345/156 |

FOREIGN PATENT DOCUMENTS

| | | |
|---|---|---|
| CN | 103473799 A | 12/2013 |
| JP | 2001276414 A | 10/2001 |
| JP | 2001334065 A | 12/2001 |
| JP | 2002251626 A | 9/2002 |
| JP | 2003337958 A | 11/2003 |
| JP | 2004258334 A | 9/2004 |
| JP | 2007082859 A | 4/2007 |
| WO | 2015027953 A1 | 3/2015 |

OTHER PUBLICATIONS

English Translation of the Written Opinion of the International Search Authority in international application No. PCT/CN2015/073033, dated May 13, 2015.

Yasunobu Iizuka, Learning Android programming with sample creation. The 6th, the romantic application made with live wallpaper, Nikkei Software vol. 15 No. 2, Japan, Nikkei BP company, Dec. 24, 2011, Feb. 2012, p. 110-115 , ISSN 1347-4685.

English translation of the Notification of the First Office Action of Japanese application No. 2016-544825, dated Jun. 18, 2017.

\* cited by examiner

ANIMATION PLAYBACK METHOD AND APPARATUS

CROSS REFERENCE TO RELATED APPLICATIONS

This is a continuation application of International Patent Application No.: PCT/CN2015/073033, filed on Feb. 13, 2015, which claims priority to Chinese Patent Application No.: 201410065537.6 filed on Feb. 25, 2014, the disclosures of which are incorporated by reference herein in their entirety.

FIELD OF THE TECHNOLOGY

The present disclosure relates to the field of computer technologies, and in particular, to an animation playback method and apparatus.

BACKGROUND OF THE DISCLOSURE

To decorate a web page, a programmer sets an animation file for decorating the web page in web page data, and a terminal plays the animation file in a region in the web page when displaying the web page, for example, the terminal plays, in a top region in the web page, an animation of falling of a snowflake, an animation of falling of a tree leaf, or the like.

Currently, an animation file is formed by frames of images, and all these images are drawn by technical personnel. For example, for an animation of falling of a snowflake, technical personnel obtain through calculation a location of the snowflake at each time point according to a motion mode such as uniform motion or simple nonlinear motion; separately draw, according to the location of the snowflake at each time point, a frame of image corresponding to each time point, and form an animation file of falling of the snowflake by chronologically organizing each frame of image; and then put the animation file into web page data. A terminal may play the animation of falling of the snowflake in a top region in the web page when displaying the web page.

During the implementation of the present disclosure, the inventors find that the existing technology at least has the following problems:

An animation file in web page data includes multiple images, and the images occupy a great capacity; as a result, a terminal consumes more traffic when acquiring the web page data, and prolonging a time used by the terminal to acquire the web page data.

SUMMARY

To reduce traffic required by a terminal for acquiring web page data, and shorten a time used by the terminal to acquire the web page data, the present disclosure provides an animation playback method and apparatus. The technical solutions are as follows:

An animation playback method includes:

at a computing device having one or more processors and memory storing programs executed by the one or more processors:

acquiring a first location and a first offset angle of an object in a first period, the first period being before a current period;

acquiring a second location of the object in the current period according to the first location and the first offset angle; and drawing an image of the object in a preset region in a web page according to the second location if the second location is in the preset region in the web page.

An animation playback apparatus includes: one or more processors; memory; and one or more program modules stored in the memory and executed by the one or more processors, the one or more program modules including:

a first acquisition module, configured to acquire a first location and a first offset angle of an object in a first period, the first period being before a current period;

a second acquisition module, configured to acquire a second location of the object in the current period according to the first location and the first offset angle that are acquired by the first acquisition module; and a first drawing module, configured to draw an image of the object in a preset region in a web page according to the second location if the second location acquired by the second acquisition module is in the preset region in the web page.

A non-transitory computer readable storage medium having stored therein one or more instructions, which, when executed by a computing device, cause the computing device to:

acquiring a first location and a first offset angle of an object in a first period, the first period being before a current period;

acquiring a second location of the object in the current period according to the first location and the first offset angle; and drawing an image of the object in a preset region in a web page according to the second location if the second location is in the preset region in the web page.

In embodiments of the present invention, a first location and a first offset angle of an object in a first period are acquired, the first period being before a current period; a second location of the object in the current period is acquired according to the first location and the first offset angle; and an image of the object is drawn in a preset region in a web page according to the second location if the second location is in the preset region in the web page. A terminal acquires a second location of an object in a current period according to a first location and a first offset angle of the object in a first period, and draws an image of the object in a preset region in a web page according to the second location; therefore, in such a manner of periodically drawing an image of the object in the preset region, an animation is played in the preset region without increasing a capacity of web page data, thereby reducing traffic required by the terminal for acquiring the web page data, and shortening a time used by the terminal to acquire the web page data.

BRIEF DESCRIPTION OF THE DRAWINGS

FIG. 2-1 is a flowchart of an animation playback method according to Embodiment 2 of the present invention;

FIG. 2-2 is a first schematic diagram of a preset region according to Embodiment 2 of the present invention;

FIG. 2-3 is a second schematic diagram of a preset region according to Embodiment 2 of the present invention;

FIG. 2-4 is a third schematic diagram of a preset region according to Embodiment 2 of the present invention; and FIG. 3 is a schematic structural diagram of an animation playback apparatus according to Embodiment 3 of the present invention.

DESCRIPTION OF EMBODIMENTS

To make the objective, technical solutions, and advantages of the present disclosure clearer, the following further describes the embodiments of the present invention in detail with reference to the accompanying drawings.

Embodiment 1

Figure 1:
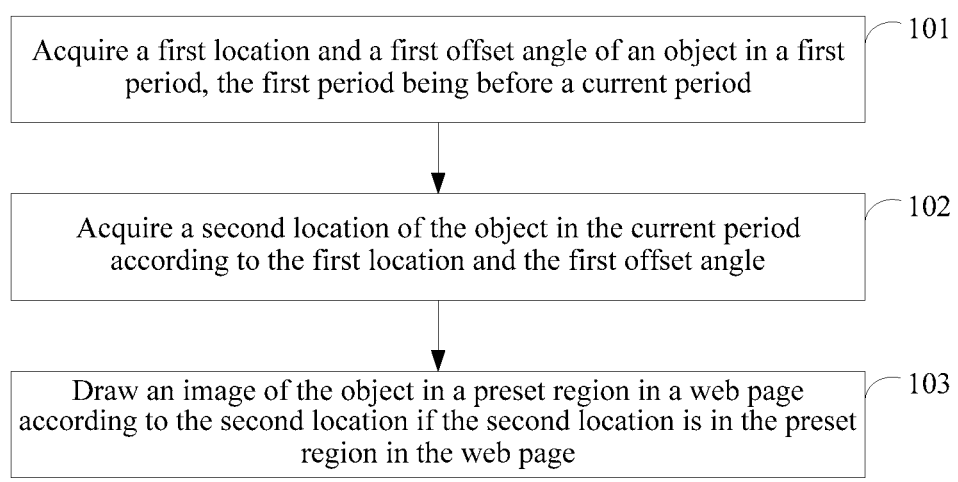
FIG. 1 is a flowchart of an animation playback method according to Embodiment 1 of the present invention.

Referring to FIG. 1, this embodiment of the present invention provides an animation playback method, including:

Step 101: Acquire a first location and a first offset angle of an object in a first period, the first period being before a current period.

Step 102: Acquire a second location of the object in the current period according to the first location and the first offset angle.

Step 103: Draw an image of the object in a preset region in a web page according to the second location if the second location is in the preset region in the web page.

Preferably, the acquiring a first location and a first offset angle of an object in a first period includes:

acquiring a corresponding location and offset angle from a correspondence among an identifier, a location, and an offset angle of the object according to the identifier of the object; and determining the acquired location and offset angle as the first location and the first offset angle of the object in the first period, respectively.

Further, before the acquiring a first location and a first offset angle of an object in a first period, the method further includes:

acquiring a preset number of consecutive periods when the web page starts to be displayed, and determining, according to a length and a width of the preset region in the web page, the number of objects that are added to the preset region in each of the acquired periods;

determining, when an acquired period arrives, according to the number of objects that are added to the preset region in the period that arrives and the width of the preset region, an initial location of each of the added objects in the preset region, and a size and an initial value of an offset angle of each of the objects; and allocating an identifier to each of the objects;

drawing an image of each of the objects in the preset region according to the initial location and the size of each of the objects; and storing the identifier, the initial location, and the initial value of the offset angle of each of the objects in a correspondence among the identifier, the location, and the offset angle of the object.

Preferably, the acquiring a second location of the object in the current period according to the first location and the first offset angle includes:

increasing the first offset angle, to obtain a second offset angle of the object in the current period;

calculating a location offset of the object according to the second offset angle; and calculating the second location of the object in the current period according to the first location and the location offset of the object.

Preferably, the calculating a location offset of the object according to the second offset angle includes:

calculating the location offset of the object according to the second offset angle by using a formula (1) shown below, where the location offset includes a horizontal coordinate offset and a vertical coordinate offset:

$$\begin{cases} m = 2*\sin(\text{angle}) \\ n = \cos(\text{angle}+\rho) + 1 + r/2 \end{cases} \quad (1)$$

Preferably, in the formula (1), m is the horizontal coordinate offset, n is the vertical coordinate offset, $\rho$ is a preset density of the object, r is a size of the object, and angle is the second offset angle.

Further, after the calculating the second location of the object in the current period according to the first location and the location offset of the object, the method further includes:

updating, in a correspondence among an identifier, a location, and an offset angle of the object, the first location and the first offset angle of the object to the second location and the second offset angle of the object.

Further, the method further includes:

determining, if the second location is not in the preset region in the web page, the initial location of the object in the preset region according to the length and the width of the preset region, and drawing the image of the object in the preset region according to the initial location.

Further, after the determining the initial location of the object at the top of the preset region, the method further includes:

increasing the first offset angle, to obtain the second offset angle of the object in the current period; and updating, in the correspondence among the identifier, the location, and the offset angle of the object, the first location and the first offset angle of the object to the initial location and the second offset angle of the object.

In this embodiment of the present invention, a first location and a first offset angle of an object in a first period are acquired, the first period being before a current period; a second location of the object in the current period is acquired according to the first location and the first offset angle; and an image of the object is drawn in a preset region in a web page according to the second location if the second location is in the preset region in the web page. A terminal acquires a second location of an object in a current period according to a first location and a first offset angle of the object in a first period, and draws an image of the object in a preset region in a web page according to the second location; therefore, in such a manner of periodically drawing an image of the object in the preset region, an animation is played in the preset region without increasing a capacity of web page data, thereby reducing traffic required by the terminal for acquiring the web page data, and shortening a time used by the terminal to acquire the web page data.

Embodiment 2

This embodiment of the present invention provides an animation playback method.

In this embodiment of the present invention, a terminal periodically calculates a location of an object in a period when the terminal displays a web page, and draws an image of the object in a preset region in the web page according to the location of the object, so as to play an animation.

Figures 1, 2:
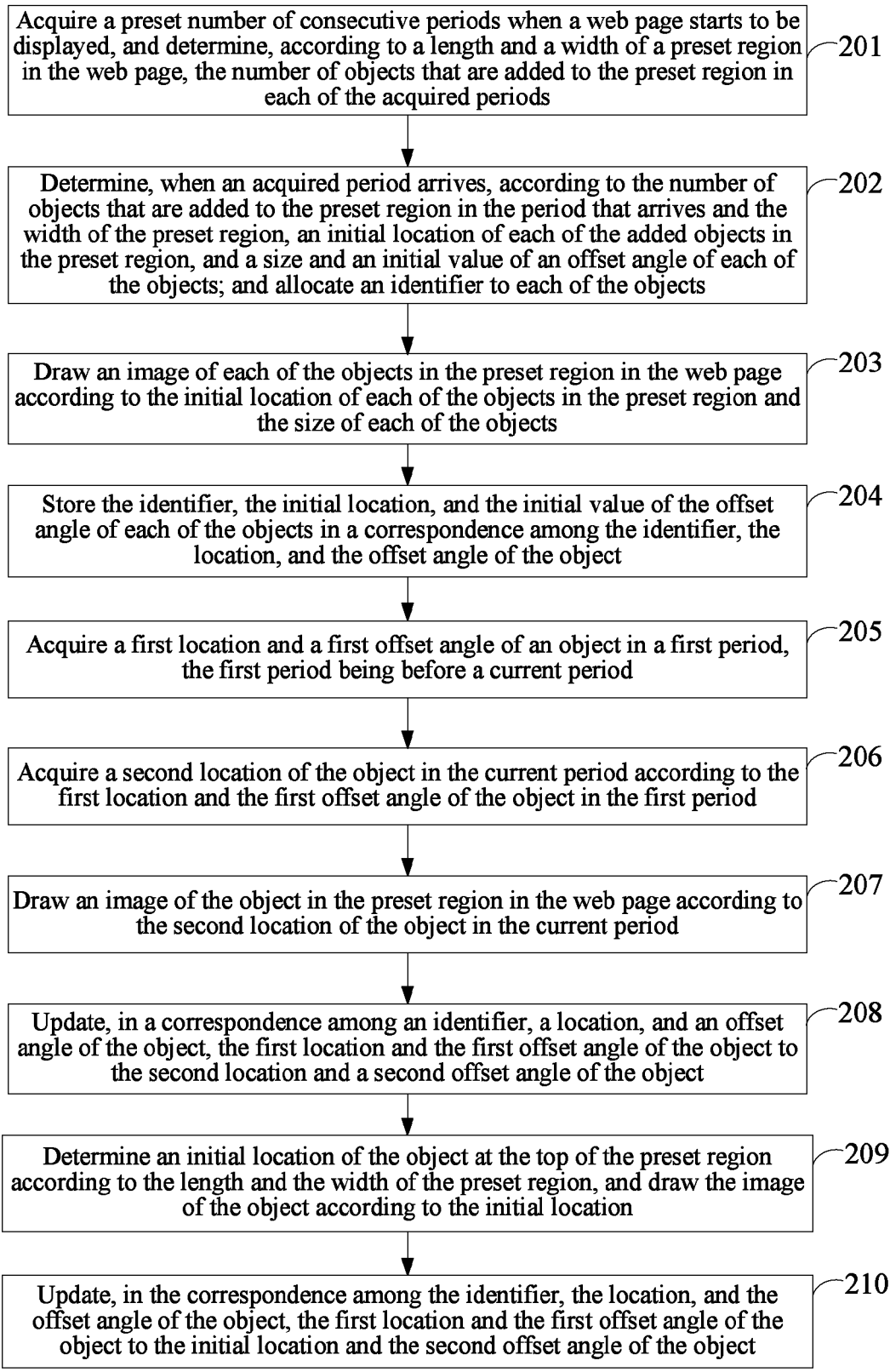
Figure 2:
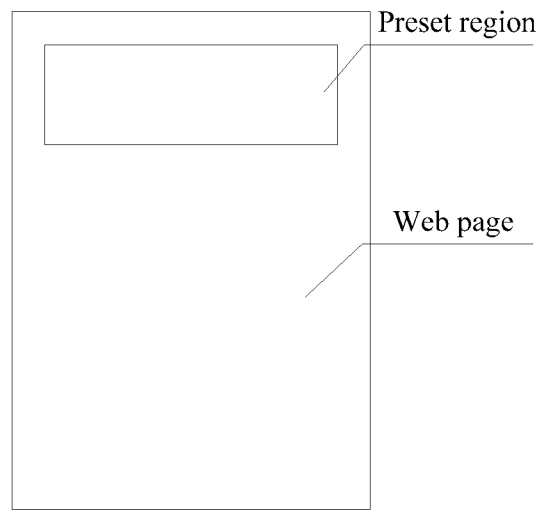

Referring to FIG. 2-1, the method includes:

Step 201: Acquire a preset number of consecutive periods when a web page starts to be displayed, and determine, according to a length and a width of a preset region in the web page, the number of objects that are added to the preset region in each of the acquired periods.

The preset region in the web page is a region for playing an animation, and may be a canvas element, in the web page, for playing an animation or the like. The preset region may be located on the top, the bottom, the left, the right, or the like of the web page. For example, a preset region shown in FIG. 2-2 is at the top of a web page. In a preset number of consecutive periods after the web page starts to be displayed, an object is added to the preset region in each period to fill up the preset region.

This step may be: acquiring the length and the width of the preset region in the web page when the web page starts to be displayed, calculating an area of the preset region according to the acquired length and width, calculating, according to a preset density of the object and the calculated area of the preset region, a product of the preset density of the object and the area of the preset region, and determining the calculated product as a total number of objects when the preset region is filled up with the objects; acquiring a preset number of consecutive periods that are preset; and calculating the number of newly added objects in each period according to the calculated total number of the objects and the number of the acquired periods.

For example, in this embodiment of the present invention, an example in which an animation of falling of a snowflake is played is used for description, and in this example, the object is the snowflake. For the preset region in the web page shown in FIG. 2-2, it is assumed that a length and a width of the preset region are both 10, and a preset density of the snowflake is 0.1. When the web page is displayed, the length of 10 and the width of 10 of the preset region in the web page are acquired, an area of the preset region is calculated, according to the acquired length of 10 and the acquired width of 10, to be 100, a product of the preset density of 0.1 of the snowflake and the area of 100 of the preset region is calculated, according to the preset density of 0.1 of the snowflake and the calculated area of 100 of the preset region, to be 10, and the calculated product of 10 is determined as a total number of snowflakes when the preset region is filled up with the snowflakes. It is preset that the preset region is filled up with snowflakes in a preset number of consecutive periods, and it is assumed that the preset number of periods is 5, and the preset 5 consecutive periods are acquired. The number of newly added snowflakes in each period is calculated, according to the calculated total number 10 of the snowflakes and the number 5 of the acquired periods, to be 2.

Step 202: Determine, when an acquired period arrives, according to the number of objects that are added to the preset region in the period that arrives and the width of the preset region, an initial location of each of the added objects in the preset region, and a size and an initial value of an offset angle of each of the objects; and allocate an identifier to each of the objects.

The offset angle is an included angle between displacement of the object in one period and a preset direction. For example, if a location of the object in one period changes from a point A to a point B, displacement of the object in the period is displacement AB; and it is assumed that the preset direction is a horizontal direction to the right, and then an offset angle of the object in the period is an included angle between the displacement AB and the horizontal direction to the right.

This step is specifically: when the acquired period arrives, randomly setting a horizontal coordinate of each of the added objects according to the number of the objects that are added to the preset region in the period that arrives and the acquired width of the preset region, and setting a vertical coordinate of each of the objects to zero, so that the initial location of each of the objects in the preset region is obtained; setting the size of each of the objects, where the size of each of the objects is within a preset size range; setting the initial value of the offset angle of each of the objects, where, for example, the initial value of the offset angle of each of the objects may be set to 0 or 1; and allocating the identifier to each of the objects.

The set size of each of the objects may be equal, or may not be equal.

For example, when the acquired period arrives, it is assumed that when the first period of the acquired periods arrives, according to the number 2 of snowflakes that are added to the preset region in the first period and the width of 10 of the preset region, a value of a horizontal coordinate of a snowflake is randomly set, and a value of a vertical coordinate of the snowflake is set to zero. If a set value of a horizontal coordinate of one snowflake is 1, initial location coordinates of the snowflake are (1, 0). If a set value of a horizontal coordinate of the other snowflake is 5, initial location coordinates of the snowflake are (5, 0). It is assumed that 3 different radii are preset, which are 0.2, 0.4, and 0.6; one radius is selected from the 3 preset radii, and it is assumed that the selected radius is 0.4, and the selected radius of 0.4 is used as a radius of the 2 added snowflakes. An initial value of an offset angle of the 2 snowflakes is set to 0. An identifier 001 is allocated to the snowflake whose initial location coordinates are (1, 0), and an identifier 002 is allocated to the snowflake whose initial location coordinates are (5, 0).

Similar to the period, for each of the other acquired periods, the foregoing operations are performed to determine an initial location of each of the objects in the preset region, and a size and an initial value of an offset angle of each of the objects; and allocate an identifier to each of the objects.

After the initial location of each of the objects in the preset region, and the size and the initial value of the offset angle of each of the objects are determined, an operation in step 203 of drawing an initial image of each of the objects in the preset region in the web page in the period that arrives is performed.

Step 203: Draw an image of each of the objects in the preset region in the web page according to the initial location of each of the objects in the preset region and the size of each of the objects.

Figures 2, 3:
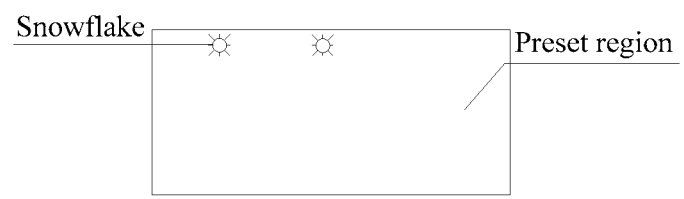

For example, as shown in FIG. 2-3, according to the initial location (1, 0) of the snowflake 001 in the preset region and the radius of 0.4 of the snowflake, and the initial location (5, 0) of the snowflake 002 in the preset region and the radius of 0.4 of the snowflake, images of the 2 snowflakes are drawn in the preset region in the web page.

After the image of each of the objects is drawn in the preset region in the web page in the period that arrives, the identifier, the initial location, and the initial value of the offset angle of each of the objects are stored by using the following step 204.

Step 204: Store the identifier, the initial location, and the initial value of the offset angle of each of the objects in a correspondence among the identifier, the location, and the offset angle of the object.

For example, an identifier, an initial location, and an initial value of an offset angle of each of the snowflakes are stored in a correspondence among an identifier, a location, and an offset angle of a snowflake shown in Table 1.

TABLE 1

| Identifier of snowflake | Location | Offset angle |
|---|---|---|
| 001 | (1, 0) | 0 |
| 002 | (5, 0) | 0 |
| ... | ... | ... |

Further, if the sizes of the objects are different, a correspondence between the identifier and the size of each of the objects further needs to be stored.

Similar to the period, for each of the other acquired periods, operations of the foregoing step 202 to step 204 are performed to draw an image of each of added objects in the preset region in the web page according to an initial location of each of the added objects in the preset region when each of the acquired periods arrives.

Starting from a second period after the web page is displayed, each time when a period arrives, the image of each of the objects in the preset region needs to be re-drawn. For ease of description, an object is used as an example for description in this embodiment, and similar to the object, for each of the other objects in the preset region except the object, operations in the following step 205 to step 210 are performed to re-draw the image of each of the objects.

Step 205: Acquire a first location and a first offset angle of an object in a first period, the first period being before a current period.

The first period is before the current period and is adjacent to the current period.

This step is specifically: acquiring an identifier of the object from the preset region, acquiring a corresponding location and offset angle from a stored correspondence among the identifier, a location, and an offset angle of the object according to the acquired identifier of the object, and determining the acquired location and offset angle as the first location and the first offset angle of the object in the first period, respectively.

For example, the identifier 001 of the snowflake is acquired from the preset region, the corresponding location (1, 0) and offset angle of 0 are acquired from the stored correspondence among the identifier, the location, and the offset angle of the snowflake shown in Table 1 according to the acquired identifier 001 of the snowflake, and the acquired location (1, 0) and offset angle of 0 are determined as a first location and a first offset angle of the snowflake in the first period, respectively.

Step 206: Acquire a second location of the object in the current period according to the first location and the first offset angle of the object in the first period.

Specifically, an offset angle increasing amount is preset, for example, the offset angle increasing amount may be 0.01 or 0.02. The preset offset angle increasing amount is added to the acquired first offset angle of the object in the first period, so as to increase the first offset angle, to obtain a second offset angle of the object in the current period; a location offset of the object is calculated according to the second offset angle by using a formula (1) shown below; and the second location of the object in the current period is calculated according to the first location and the location offset of the object by using a formula (2) shown below:

$$\begin{cases} m = 2*\sin(\text{angle}) \\ n = \cos(\text{angle}+\rho) + 1 + r/2 \end{cases} \quad (1)$$

where, in the formula (1), m is a location offset of a horizontal coordinate of the object, n is a location offset of a vertical coordinate of the object, ρ is a preset density of the object, r is a size of the object, and angle is the second offset angle of the object in the current period; and $$\begin{cases} x = x' + m \\ y = y' + n \end{cases} \quad (2)$$

where, in the formula (2), x is a horizontal coordinate of the second location of the object in the current period, x' is a horizontal coordinate of the first location of the object in the first period, y is a vertical coordinate of the second location of the object in the current period, and y' is a vertical coordinate of the first location of the object in the first period.

For example, it is assumed that the preset offset angle increasing amount is 0.01, the preset density of the snowflake is 0.1, and the radius of the snowflake is 0.4. The preset offset angle increasing amount of 0.01 is added to the acquired first offset angle of 0 of the snowflake in the first period, so as to increase the first offset angle, to obtain a second offset angle of 0.01 of the snowflake in the current period; a location offset of a horizontal coordinate of the snowflake is calculated, according to the second offset angle of 0.01 by using a formula (3) shown below, to be 0.02, a location offset of the vertical coordinate of the snowflake is calculated to be 2.19; and a second location of the snowflake in the current period is calculated, according to the first location (1, 0), the location offset of 0.02 of the horizontal coordinate of the snowflake, and the location offset of 2.19 of the vertical coordinate of the snowflake by using a formula (4) shown below, to be (1.02, 2.19):

$$\begin{cases} m = 2*\sin(0.01) = 0.02 \\ n = \cos(0.01+0.1) + 1 + 0.4/2 = 2.19 \end{cases} \quad (3)$$

and $$\begin{cases} x = 1 + 0.02 = 1.02 \\ y = 0 + 2.19 = 2.19 \end{cases} \quad (4)$$

Further, if the sizes of the objects are different, the size of the object needs to be acquired from a stored correspondence between the identifier and the size of each of the objects according to the identifier of the object, and the second location of the object in the current period is acquired according to the size of the object, and the first location and the first offset angle of the object in the first period.

After the second location of the object is acquired, it is determined whether the horizontal coordinate and the vertical coordinate of the second location are less than the length and the width of the preset region in the web page, respectively; and if yes, it is determined that the second location is in the preset region in the web page, and step 207 of drawing an image of the object in the preset region in the web page is performed. If not, it is determined that the second location is not in the preset region in the web page, and step 209 is performed to determine an initial location of the object at the top of the preset region, and draw the image of the object according to the initial location.

Step 207: Draw an image of the object in the preset region in the web page according to the second location of the object in the current period.

Specifically, the image of the object in the preset region in the web page is deleted, and the image of the object is drawn in the preset region according to the second location of the object in the current period.

Figures 2, 3, 4:
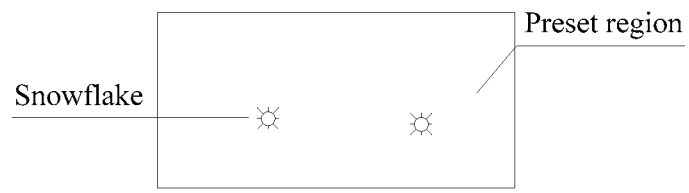
Figure 3:
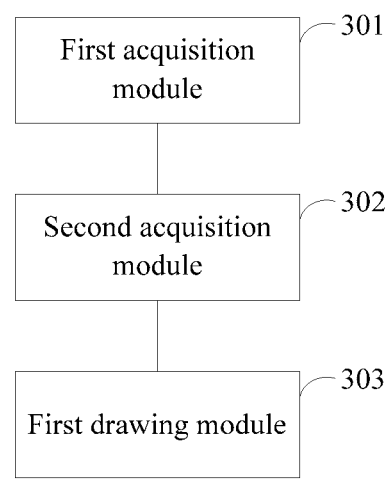

For example, the acquired second location of the snowflake is (1.02, 2.19), the horizontal coordinate of 1.02 of the second location is less than the length of 10 of the preset region, and the vertical coordinate of 2.19 is less than the width of 10 of the preset region; and it is determined that the second location is in the preset region, the image of the snowflake in the preset region in the web page is deleted, and the image of the snowflake is drawn in the preset region according to the second location (1.02, 2.19) of the snowflake in the current period, as shown in FIG. 2-4.

After the image of the object is drawn in the preset region in the web page according to the second location of the object in the current period, the location and the offset angle of the object in the correspondence among the identifier, the location, and the offset angle of the object are updated by using the following step 208.

Step 208: Update, in a correspondence among an identifier, a location, and an offset angle of the object, the first location and the first offset angle of the object to the second location and a second offset angle of the object.

Specifically, the identifier of the object is acquired from the preset region, the first location and the first offset angle of the object are acquired from the correspondence among the identifier, the location, and the offset angle of the object according to the acquired identifier of the object, the acquired first location of the object is updated to the second location of the object, and the acquired first offset angle of the object is updated to the second offset angle of the object.

For example, the identifier 001 of the snowflake is acquired from the preset region, the first location (1, 0) and the first offset angle of 0 of the snowflake are acquired from the correspondence among the identifier, the location, and the offset angle of the snowflake shown in Table 1 according to the acquired identifier 001 of the snowflake, the acquired first location (1, 0) of the snowflake is updated to the second location (1.02, 2.19) of the snowflake, and the acquired first offset angle of 0 of the snowflake is updated to the second offset angle of 0.01 of the snowflake, as shown in Table 2.

TABLE 2

| Identifier of snowflake | Location | Offset angle |
| --- | --- | --- |
| 001 | (1.02, 2.19) | 0.01 |
| ... | ... | ... |

When a next period arrives, by using step 205, the location of the object is calculated and the image of the object is drawn in the preset region in the web page according to the location of the object.

Step 209: Determine an initial location of the object at the top of the preset region according to the length and the width of the preset region, and draw the image of the object according to the initial location.

Specifically, a value of the horizontal coordinate of the object is randomly set according to the determined number of the objects and the acquired width of the preset region, a value of the vertical coordinate of the object is set to zero, and the initial location of the object at the top of the preset region is formed by using the set value of the horizontal coordinate and the set value of the vertical coordinate. The image of the object in the preset region in the web page is deleted, and the image of the object is drawn in the preset region according to the initial location of the object at the top of the preset region.

Further, after the initial location of the object at the top of the preset region is determined, the preset offset angle increasing amount is further added to the acquired first offset angle of the object in the first period, so as to increase the first offset angle, to obtain the second offset angle of the object in the current period.

For example, it is assumed that the acquired second location of the snowflake is (11, 9), and then the horizontal coordinate of 11 of the second location is greater than the length of 10 of the preset region, and therefore, it is determined that the second location is not in the preset region. The value of the horizontal coordinate of the snowflake is randomly set according to the determined number 10 of snowflakes and the acquired length of 10 of the preset region, and the value of the vertical coordinate of the snowflake is set to zero; it is assumed that the set value of the horizontal coordinate of the snowflake is 3, and the initial location (3, 0) of the snowflake at the top of the preset region is formed by using the set value 3 of the horizontal coordinate and the set value 0 of the vertical coordinate. The image of the snowflake in the preset region in the web page is deleted, and the image of the snowflake is drawn in the preset region according to the initial location (3, 0) of the snowflake at the top of the preset region.

Further, after the initial location of the object at the top of the preset region is determined, the preset offset angle increasing amount of 0.01 is further added to the acquired first offset angle of 0 of the object in the first period, so as to increase the first offset angle, to obtain the second offset angle of 0.01 of the object in the current period.

After the image of the object is drawn in the preset region in the web page according to the initial location of the object, the location and the offset angle of the object in the correspondence among the identifier, the location, and the offset angle of the object are updated by using the following step 210.

Step 210: Update, in the correspondence among the identifier, the location, and the offset angle of the object, the first location and the first offset angle of the object to the initial location and the second offset angle of the object.

Specifically, the identifier of the object is acquired from the preset region, the first location and the first offset angle of the object are acquired from the correspondence among the identifier, the location, and the offset angle of the object according to the acquired identifier of the object, the acquired first location of the object is updated to the initial location of the object, and the acquired first offset angle of the object is updated to the second offset angle of the object.

For example, the identifier 001 of the snowflake is acquired from the preset region, the first location (1, 0) and the first offset angle of 0 of the snowflake are acquired from the correspondence among the identifier, the location, and the offset angle of the snowflake shown in Table 1 according to the acquired identifier 001 of the snowflake, the acquired first location (1, 0) of the snowflake is updated to the initial location (3, 0) of the snowflake, and the acquired first offset angle of 0 of the snowflake is updated to the second offset angle of 0.01 of the snowflake, as shown in Table 3.

TABLE 3

| Identifier of snowflake | Location | Offset angle |
|---|---|---|
| 001 | (3, 0) | 0.01 |
| ... | ... | ... |

When a next period arrives, by using step 205, the location of the object is calculated and the image of the object is drawn in the preset region in the web page according to the location of the object.

In this embodiment of the present invention, the location of the object in the current period is determined according to the location of the object in the first period and the offset angle, then the object in the preset region is deleted, and the image of the object is re-drawn according to the location of the object in the current period, so that an animation video in which the object moves from the location in the first period to the location in the current period is displayed in the preset region, the location of the object in the current period is periodically calculated, and the image of the object is re-drawn according to the location of the object in the current period, thereby playing the animation in the preset region in the web page.

In this embodiment of the present invention, a first location and a first offset angle of an object in a first period are acquired, the first period being before a current period; a second location of the object in the current period is acquired according to the first location and the first offset angle; and an image of the object is drawn in a preset region in a web page according to the second location if the second location is in the preset region in the web page. A terminal acquires a second location of an object in a current period according to a first location and a first offset angle of the object in a first period, and draws an image of the object in a preset region in a web page according to the second location; therefore, in such a manner of periodically drawing an image of the object in the preset region, an animation is played in the preset region without increasing a capacity of web page data, thereby reducing traffic required by the terminal for acquiring the web page data, and shortening a time used by the terminal to acquire the web page data.

Embodiment 3

Referring to FIG. 3, this embodiment of the present invention provides an animation playback apparatus, including:

a first acquisition module 301, configured to acquire a first location and a first offset angle of an object in a first period, the first period being before a current period;

a second acquisition module 302, configured to acquire a second location of the object in the current period according to the first location and the first offset angle that are acquired by the first acquisition module 301; and a first drawing module 303, configured to draw an image of the object in a preset region in a web page according to the second location if the second location acquired by the second acquisition module 302 is in the preset region in the web page.

The first acquisition module 301 includes:

an acquisition unit, configured to acquire a corresponding location and offset angle from a correspondence among an identifier, a location, and an offset angle of the object according to the identifier of the object; and a determining unit, configured to determine the location and the offset angle that are acquired by the acquisition unit as the first location and the first offset angle of the object in the first period, respectively.

Further, the apparatus further includes:

a first determining module, configured to acquire a preset number of consecutive periods when the web page starts to be displayed, and determine, according to a length and a width of the preset region in the web page, the number of objects that are added to the preset region in each of the acquired periods;

a second determining module, configured to determine, when an acquired period arrives, according to the number of objects that are added to the preset region in the period that arrives and the width of the preset region, an initial location of each of the added objects in the preset region, and a size and an initial value of an offset angle of each of the objects; and allocate an identifier to each of the objects;

a second drawing module, configured to draw an image of each of the objects in the preset region according to the initial location and the size, which are determined by the determining module, of each of the objects; and a storage module, configured to store the identifier, the initial location, and the initial value of the offset angle, which are determined by the determining module, of each of the objects in a correspondence among the identifier, the location, and the offset angle of the object.

The second acquisition module 302 includes:

an increasing unit, configured to increase the first offset angle, to obtain a second offset angle of the object in the current period; and a first calculation unit, configured to calculate a location offset of the object according to the second offset angle obtained by the increasing unit; and a second calculation unit, configured to calculate the second location of the object in the current period according to the first location and the location offset of the object that is calculated by the first calculation unit.

The first calculation unit is configured to calculate the location offset of the object according to the second offset angle by using a formula (1) shown below:

$$\begin{cases} m = 2*\sin(\text{angle}) \\ n = \cos(\text{angle}+\rho)+1+r/2 \end{cases} \quad (1)$$

where, in the formula (1), m is a location offset of a horizontal coordinate of the object, n is a location offset of a vertical coordinate of the object, $\rho$ is a preset density of the object, r is a size of the object, and angle is the second offset angle.

Further, the second acquisition module 302 is further configured to update, in a correspondence among an identifier, a location, and an offset angle of the object, the first location and the first offset angle of the object to the second location and the second offset angle of the object.

Further, the apparatus is further configured to determine, if the second location is not in the preset region in the web page, the initial location of the object in the preset region according to the length and the width of the preset region, and draw the image of the object in the preset region according to the initial location.

Further, the apparatus further includes:

an increasing module, configured to increase the first offset angle, to obtain the second offset angle of the object in the current period; and an updating module, configured to update, in the correspondence among the identifier, the location, and the offset angle of the object, the first location and the first offset angle of the object to the initial location and the second offset angle of the object.

In this embodiment of the present invention, a first location and a first offset angle of an object in a first period are acquired, the first period being before a current period; a second location of the object in the current period is acquired according to the first location and the first offset angle; and an image of the object is drawn in a preset region in a web page according to the second location if the second location is in the preset region in the web page. A terminal acquires a second location of an object in a current period according to a first location and a first offset angle of the object in a first period, and draws an image of the object in a preset region in a web page according to the second location; therefore, in such a manner of periodically drawing an image of the object in the preset region, an animation is played in the preset region without increasing a capacity of web page data, thereby reducing traffic required by the terminal for acquiring the web page data, and shortening a time used by the terminal to acquire the web page data.

The method as disclosed as following may be implemented by any appropriate computing device having one or more processors and memory. The computing device, used herein, may refer to any appropriate device with certain computing capabilities (e.g., of controlling media data to be placed at a constant speed), such as a personal computer (PC), a work station computer, a hand-held computing device (tablet), a mobile terminal (a mobile phone or a smart phone), a sever, a network server, a smart terminal, or any other user-side or server-side computing device. The memory includes storage medium, which may further include memory modules, e.g., Read-Only Memory (ROM), Random Access Memory (RAM), and flash memory modules, and mass storages, e.g., CD-ROM, U-disk, removable hard disk, etc, which are all non-transitory storage medium. The storage medium may store computer programs for implementing various processes, when executed by the processors.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An animation playback method, comprising:
   at a computing device having one or more processors and memory storing programs executed by the one or more processors:
   allocating an identifier to each of objects that are added to a preset region in a web page;
   acquiring a first location and a first offset angle of an object in a first period from a correspondence among an identifier, a location, and an offset angle of the object according to the identifier of the object, the first period being before a current period;
   acquiring a second location and a second offset angle of the object in a second period according to the first location and the first offset angle;
   updating, in the correspondence, the first location and the first offset angle of the object to the second location and the second offset angle of the object;
   drawing an image of the object in the preset region in the web page according to the second location if the second location is in the preset region in the web page;
   repeatedly performing the acquiring operations to acquire the location of the object for a next period; and
   displaying an animation in which the object moves from the location in the first period to the location in a current period in the preset region in the web page.

2. The method according to claim 1, wherein the acquiring a first location and a first offset angle of an object in a first period comprises:
   acquiring a corresponding location and offset angle from the correspondence according to the identifier of the object; and
   determining the acquired location and offset angle as the first location and the first offset angle of the object in the first period, respectively.

3. The method according to claim 1, before the acquiring a first location and a first offset angle of an object in a first period, further comprising:
   acquiring a preset number of consecutive periods when the web page starts to be displayed, and determining, according to a length and a width of the preset region in the web page, the number of objects that are added to the preset region in each of the acquired periods;
   determining, when an acquired period arrives, according to the number of objects that are added to the preset region in the period that arrives and the width of the preset region, an initial location of each of the added objects in the preset region, and a size and an initial value of an offset angle of each of the objects; and
   allocating an identifier to each of the objects;
   drawing an image of each of the objects in the preset region according to the initial location and the size of each of the objects; and
   storing the identifier, the initial location, and the initial value of the offset angle of each of the objects in the correspondence.

4. The method according to claim 1, wherein the acquiring a second location of the object in the current period according to the first location and the first offset angle comprises:
   increasing the first offset angle, to obtain the second offset angle of the object in the current period;
   calculating a location offset of the object according to the second offset angle; and
   calculating the second location of the object in the current period according to the first location and the location offset of the object.

5. The method according to claim 4, wherein the calculating a location offset of the object according to the second offset angle comprises:
   calculating the location offset of the object according to the second offset angle by using a formula (1) shown below, wherein the location offset comprises a horizontal coordinate offset and a vertical coordinate offset:

$$\begin{cases} m = 2*\sin(\text{angle}) \\ n = \cos(\text{angle}+\rho)+1+r/2 \end{cases} \quad (1)$$

wherein, in the formula (1), m is the horizontal coordinate offset, n is the vertical coordinate offset, ρ is a preset density of the object, r is a size of the object, and angle is the second offset angle.

6. The method according to claim 1, wherein the method further comprises:
determining, if the second location is not in the preset region in the web page, the initial location of the object in the preset region according to the length and the width of the preset region, and drawing the image of the object in the preset region according to the initial location.

7. The method according to claim 6, wherein the determining the initial location of the object in the preset region comprises:
determining the initial location of the object at the top of the preset region;
the method further comprises:
increasing the first offset angle, to obtain the second offset angle of the object in the current period; and
updating, in the correspondence, the first location and the first offset angle of the object to the initial location and the second offset angle of the object.

8. An animation playback apparatus, comprising:
one or more processors;
memory; and
one or more program modules stored in the memory and executed by the one or more processors, the one or more program modules comprising:
a second determining module, configured to allocate an identifier to each of objects that are added to a preset region in a web page;
a first acquisition module, configured to acquire a first location and a first offset angle of an object in a first period, the first period being before a current period from a correspondence among an identifier, a location, and an offset angle of the object according to the identifier of the object;
a second acquisition module, configured to acquire a second location and a second offset angle of the object in a second period according to the first location and the first offset angle that are acquired by the first acquisition module, and update, in the correspondence, the first location and the first offset angle of the object to the second location and the second offset angle of the object; and
a first drawing module, configured to draw an image of the object in the preset region in the web page according to the second location if the second location acquired by the second acquisition module is in the preset region in the web page, and display an animation in which the object moves from the location in the first period to the location in the current period in the preset region in the web page.

9. The apparatus according to claim 8, wherein the first acquisition module comprises:
an acquisition unit, configured to acquire a corresponding location and offset angle from the correspondence; and
a determining unit, configured to determine the location and the offset angle that are acquired by the acquisition unit as the first location and the first offset angle of the object in the first period, respectively.

10. The apparatus according to claim 8, wherein the apparatus further comprises:
a first determining module, configured to acquire a preset number of consecutive periods when the web page starts to be displayed, and determine, according to a length and a width of the preset region in the web page, the number of objects that are added to the preset region in each of the acquired periods;
a second drawing module, configured to draw an image of each of the objects in the preset region according to the initial location and the size, which are determined by the second determining module, of each of the objects; and
a storage module, configured to store the identifier, the initial location, and the initial value of the offset angle, which are determined by the determining module, of each of the objects in the correspondence;
wherein the second determining module is further configured to determine, when an acquired period arrives, according to the number of objects that are added to the preset region in the period that arrives and the width of the preset region, an initial location of each of the added objects in the preset region, and a size and an initial value of an offset angle of each of the objects; and allocate an identifier to each of the objects.

11. The apparatus according to claim 8, wherein the second acquisition module comprises:
an increasing unit, configured to increase the first offset angle, to obtain the second offset angle of the object in the current period; and
a first calculation unit, configured to calculate a location offset of the object according to the second offset angle obtained by the increasing unit; and
a second calculation unit, configured to calculate the second location of the object in the current period according to the first location and the location offset of the object that is calculated by the first calculation unit.

12. The apparatus according to claim 11, wherein the first calculation unit is configured to calculate the location offset of the object according to the second offset angle by using a formula (1) shown below:

$$\begin{cases} m = 2*\sin(\text{angle}) \\ n = \cos(\text{angle}+\rho)+1+r/2 \end{cases} \quad (1)$$

wherein, in the formula (1), m is a location offset of a horizontal coordinate of the object, n is a location offset of a vertical coordinate of the object, ρ is a preset density of the object, r is a size of the object, and angle is the second offset angle.

13. The apparatus according to claim 8, wherein the apparatus is further configured to determine, if the second location is not in the preset region in the web page, the initial location of the object in the preset region according to the length and the width of the preset region, and draw the image of the object in the preset region according to the initial location.

14. The apparatus according to claim 13, wherein the apparatus further comprises:
an increasing module, configured to increase the first offset angle, to obtain the second offset angle of the object in the current period; and
an updating module, configured to update, in the correspondence, the first location and the first offset angle of the object to the initial location and the second offset angle of the object.

15. A non-transitory computer readable storage medium having stored therein one or more instructions, which, when executed by a computing device, cause the computing device to:
- allocating an identifier to each of objects that are added to a preset region in a web page;
- acquiring a first location and a first offset angle of an object in a first period from a correspondence among an identifier, a location, and an offset angle of the object according to the identifier of the object, the first period being before a current period;
- acquiring a second location and a second offset angle of the object in a second period according to the first location and the first offset angle;
- updating, in the correspondence, the first location and the first offset angle of the object to the second location and the second offset angle of the object;
- drawing an image of the object in the preset region in the web page according to the second location if the second location is in the preset region in the web page;
- repeatedly performing the acquiring operations to acquire the location of the object for a next period; and
- displaying an animation in which the object moves from the location in the first period to the location in the current period in the preset region in the web page.

* * * * *